United States Patent
Belinsky

(10) Patent No.: US 6,856,036 B2
(45) Date of Patent: Feb. 15, 2005

(54) INSTALLATION FOR HARVESTING OCEAN CURRENTS (IHOC)

(76) Inventor: Sidney Irving Belinsky, 353 Southampton C, West Palm Beach, FL (US) 33417

( * ) Notice: Subject to any disclaimer, the term of this patent is extended or adjusted under 35 U.S.C. 154(b) by 95 days.

(21) Appl. No.: 10/177,098

(22) Filed: Jun. 21, 2002

(65) Prior Publication Data

US 2002/0197148 A1 Dec. 26, 2002

Related U.S. Application Data

(60) Provisional application No. 60/300,715, filed on Jun. 26, 2001.

(51) Int. Cl.[7] .......................... F03B 13/10; F03B 13/12; H02P 9/04
(52) U.S. Cl. ............................. 290/42; 290/43; 290/53; 290/54
(58) Field of Search .............................. 290/42, 43, 53, 290/54

(56) References Cited

U.S. PATENT DOCUMENTS

| 4,180,976 | A | * | 1/1980 | Bunn | 60/325 |
| 4,411,632 | A | * | 10/1983 | Wuenscher et al. | 440/93 |
| 4,843,249 | A | * | 6/1989 | Bussiere | 290/53 |
| 4,864,152 | A | * | 9/1989 | Pedersen | 290/53 |
| 4,868,408 | A | * | 9/1989 | Hesh | 290/52 |
| 5,440,176 | A | * | 8/1995 | Haining | 290/54 |
| 5,451,138 | A | * | 9/1995 | Istorik et al. | 415/53.1 |
| 5,882,143 | A | * | 3/1999 | Williams, Jr. | 405/78 |
| 6,246,125 | B1 | * | 6/2001 | Axtell | 290/1 A |
| 6,293,835 | B2 | * | 9/2001 | Gorlov | 440/8 |
| 6,454,546 | B1 | * | 9/2002 | Huang | 417/331 |
| 6,531,788 | B2 | * | 3/2003 | Robson | 290/43 |
| 6,551,053 | B1 | * | 4/2003 | Schuetz | 415/3.1 |

* cited by examiner

Primary Examiner—Nicholas Ponomarenko
Assistant Examiner—Julio Gonzalez R.

(57) ABSTRACT

Installation for harvesting kinetic energy of ocean currents in deepwaters is based on utilization of a semisubmersible platform and the multiple of vertically oriented Darrieus type hydraulic turbines with funnels. The turbines are located bellow sea level on distance sufficient to exclude them from being affected by wave actions. The electric power generators are located on a structure above water and transmit electric power to the shore utilizing flexible cable from semisubmersible to the sea bottom and underwater cable going to the shore, where it connected to the power distributing network. One of the Embodiments of this invention is designed to harvest energy of tides in deepwaters.

9 Claims, 18 Drawing Sheets

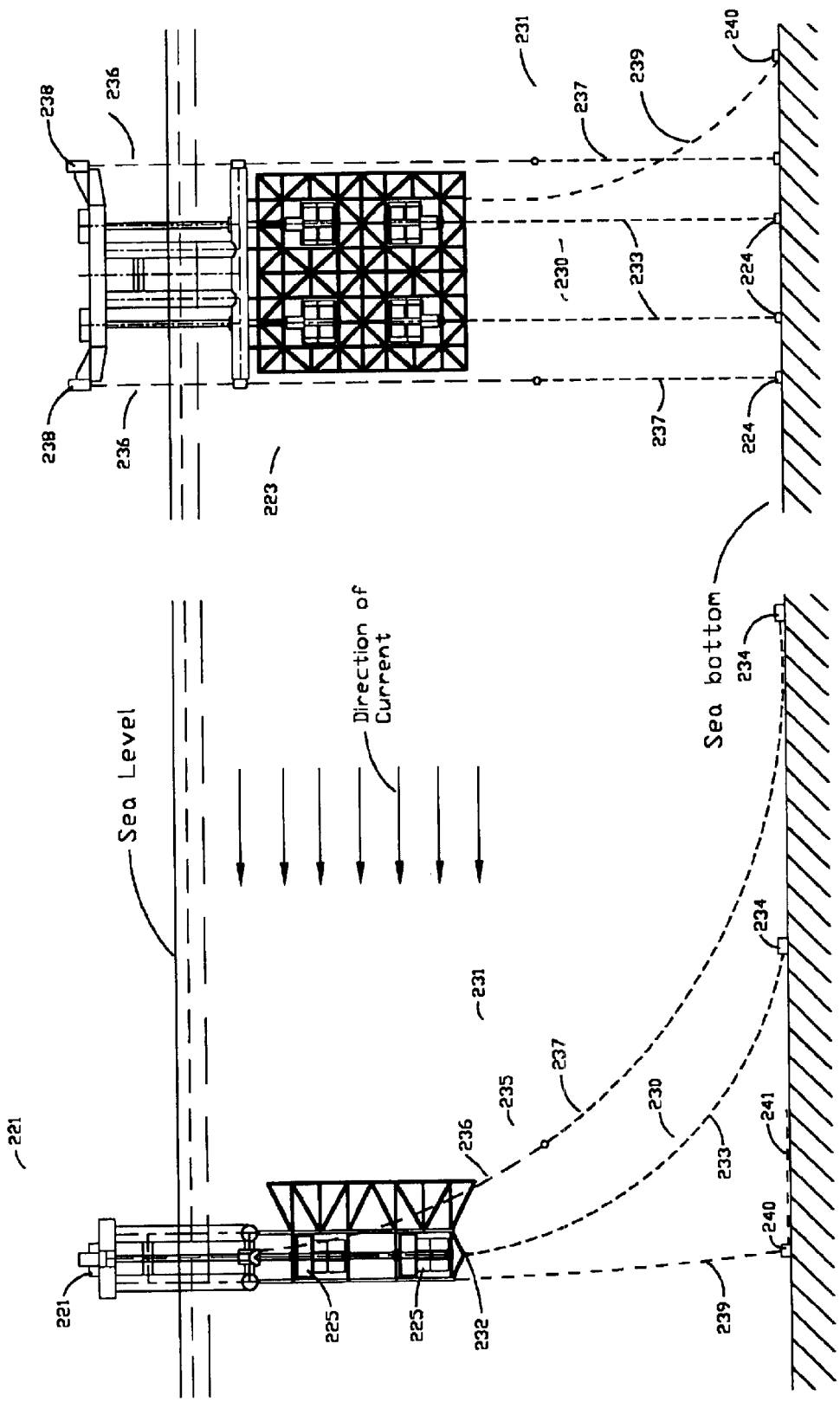

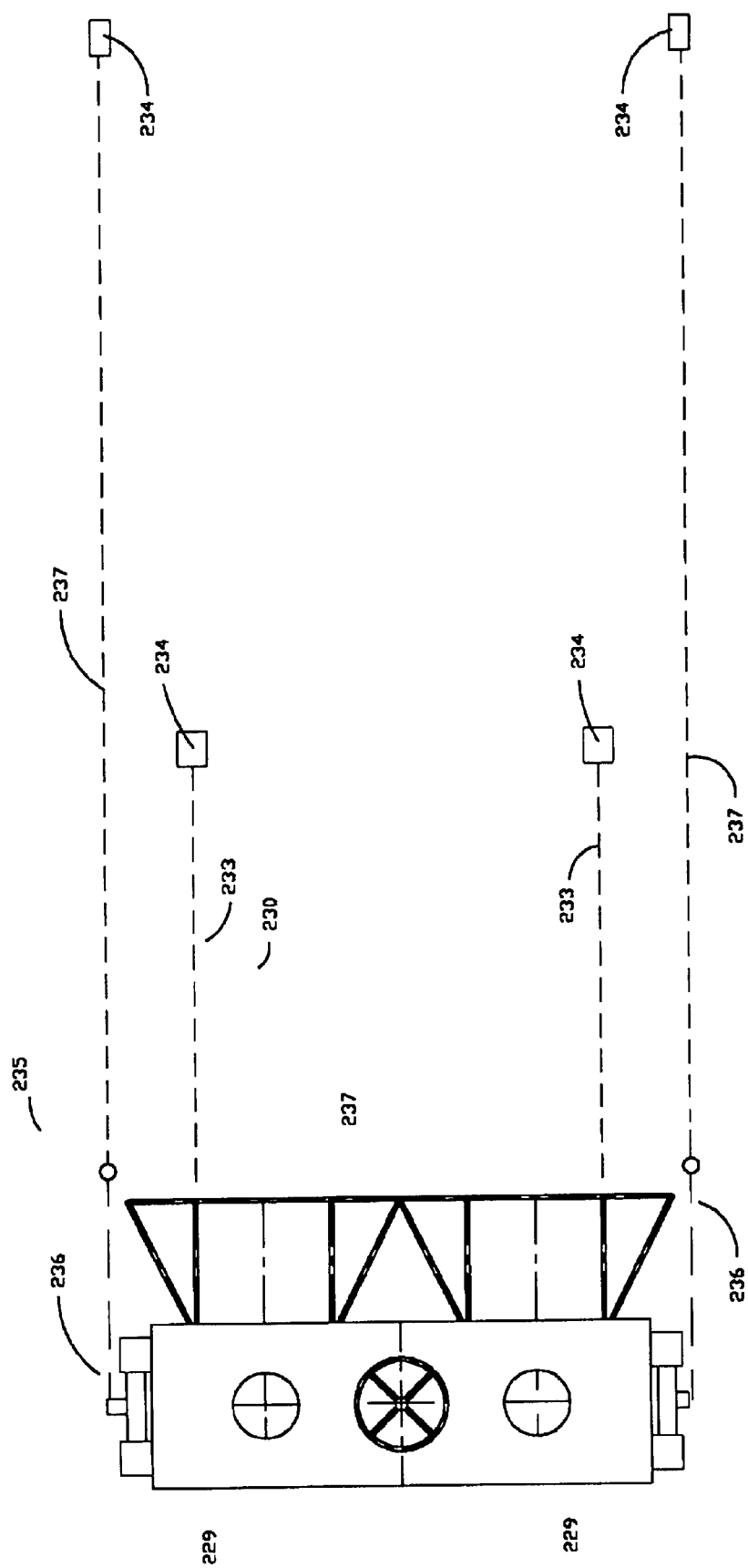

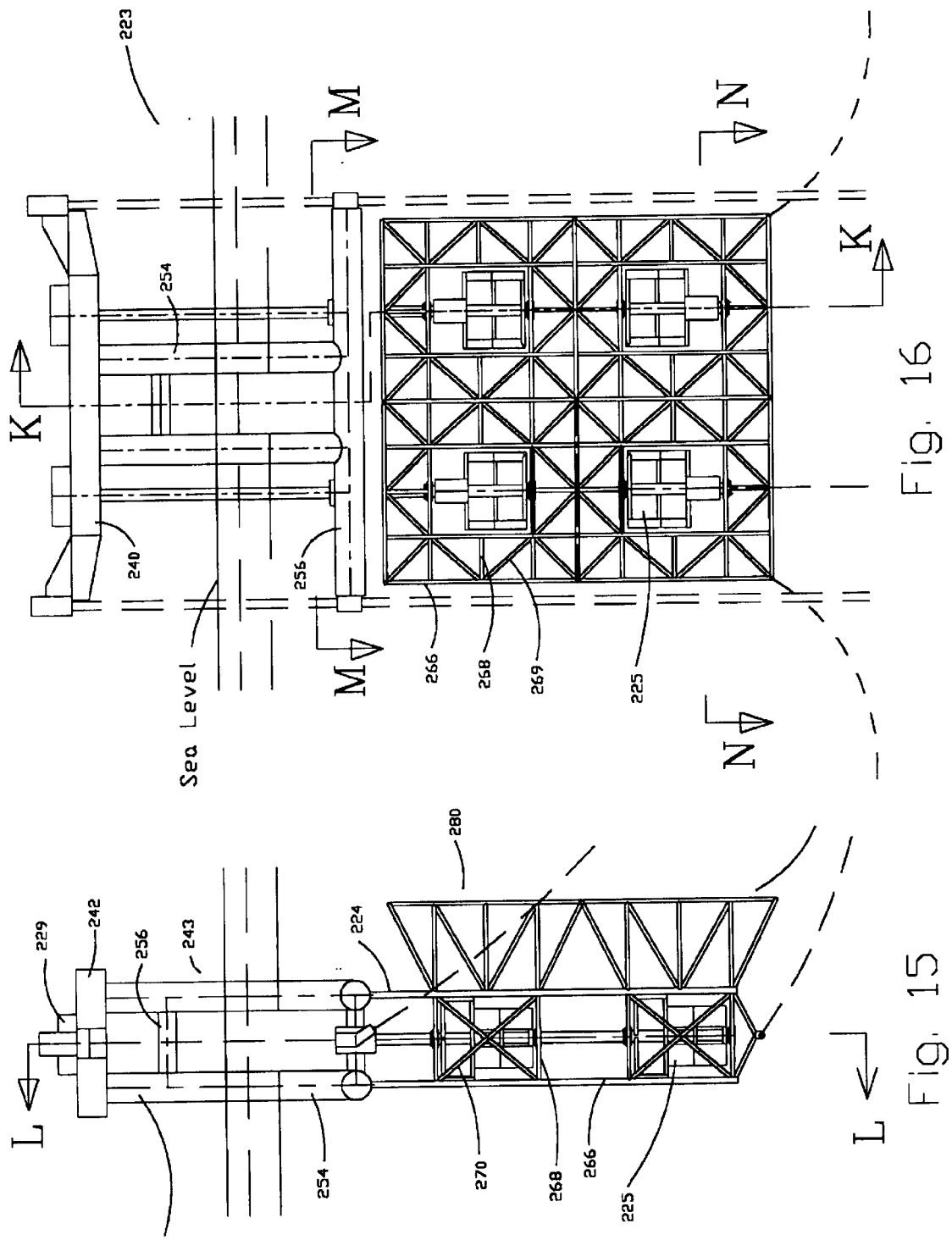

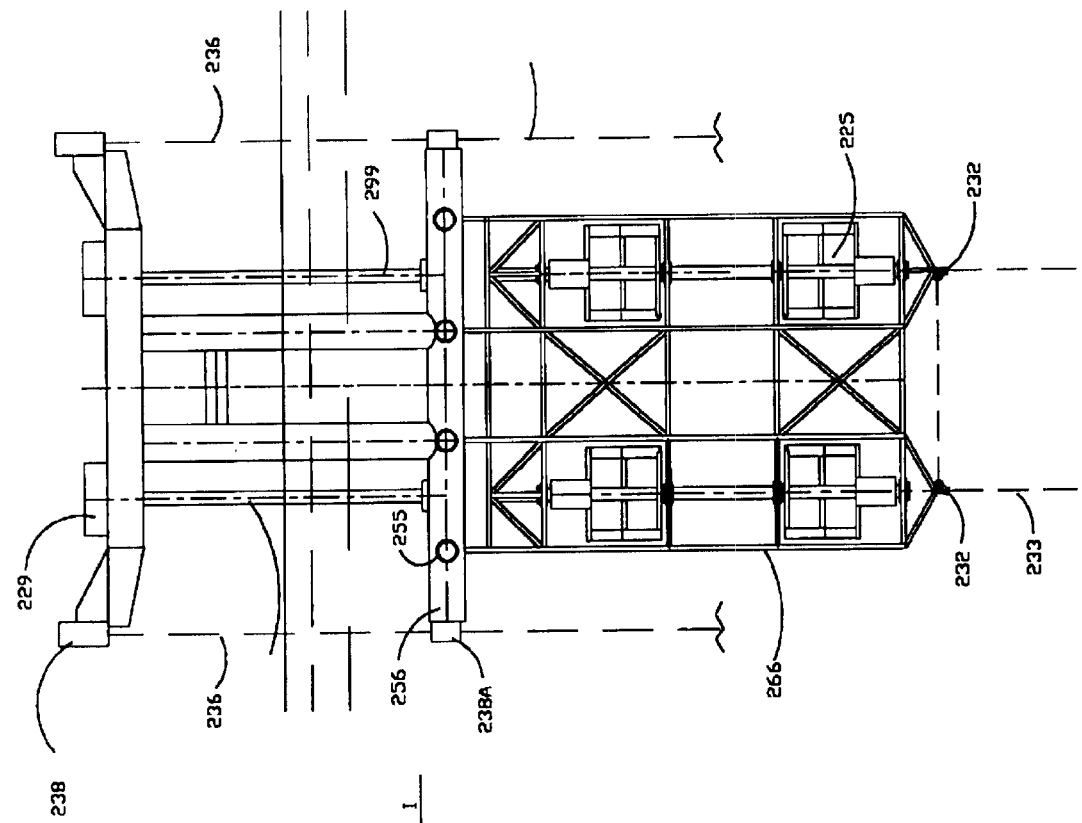
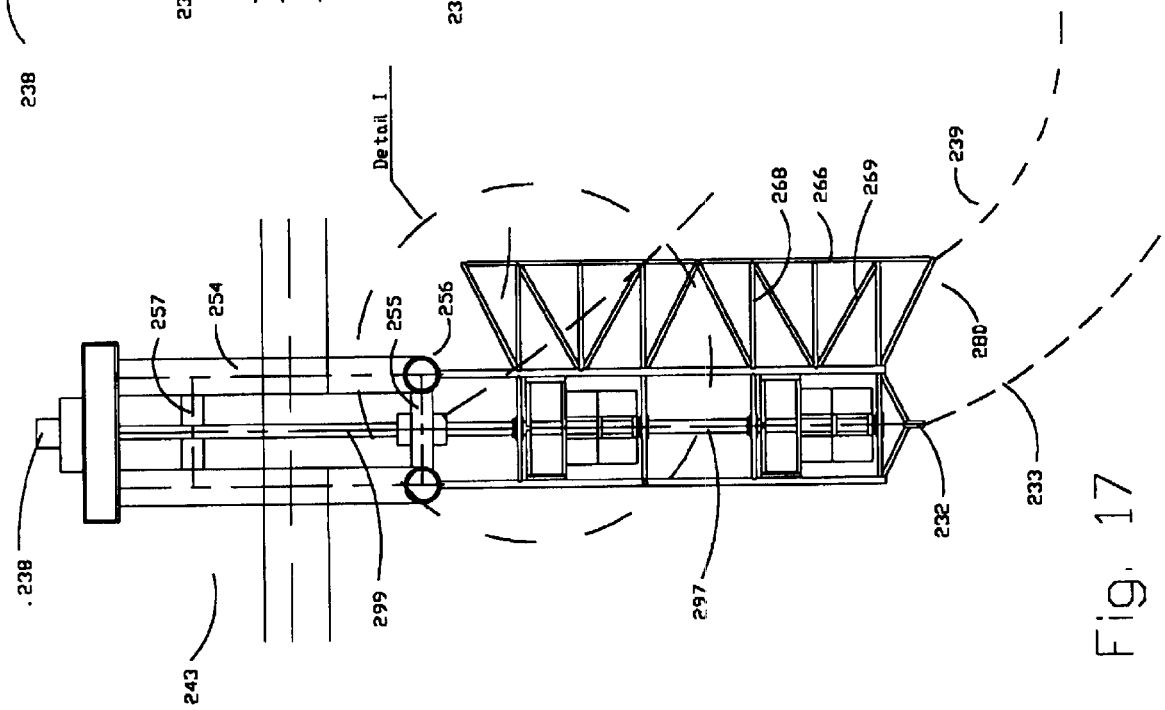
Fig. 18
Fig. 17

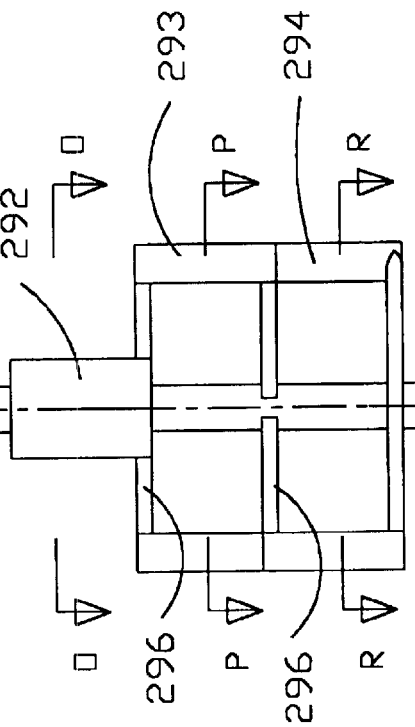
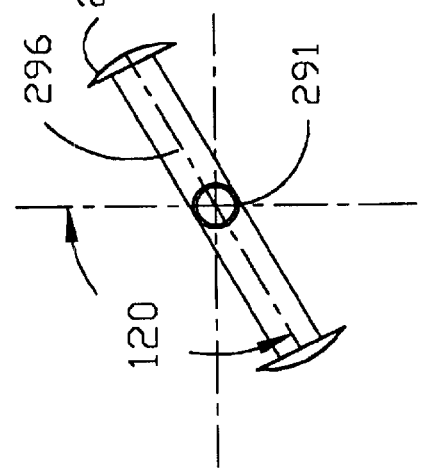
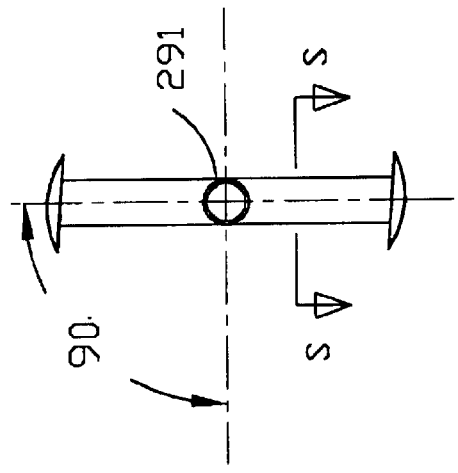
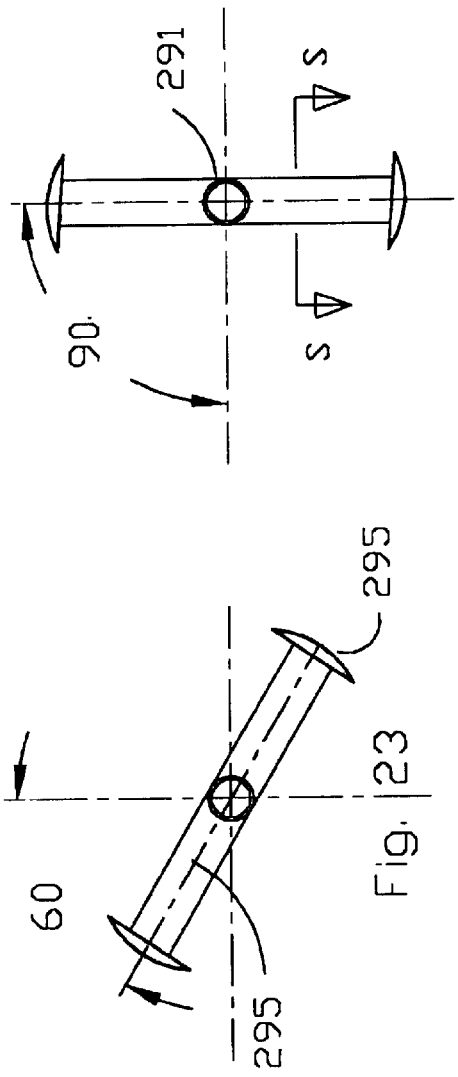
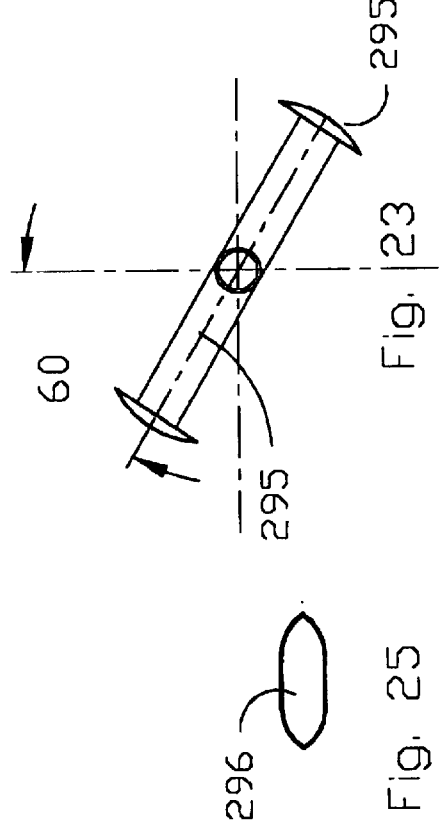

INSTALLATION FOR HARVESTING OCEAN CURRENTS (IHOC)

CROSS REFERENCE TO RELATED APPLICATION

This application is related to provisional application Ser. No. 60/300,715 entitled "Installation for harvesting ocean current" filed Jun. 26, 2001, which is incorporated herein in reference.

FIELD OF THE INVENTION

This invention relates to harvesting kinetic energy of ocean currents and tides by utilizing Darrieus type turbine in deepwaters.

BACKGROUND—DISCUSSION OF PRIOR ART

The search for means to harvest energy of ocean currents and tides has a long history and some successes. Several tidal hydropower installation are already in operation for a prolong time. Their wide use is curtailed by the need to use dams or barrages, which besides having high initial construction cost also are damaging environment. Presently there is ongoing search for the means that allow avoiding use of dams and barrages. This means are designed to harvest kinetic energy of water streams instead of potential energy of water elevated by dams or barrages.

There are two major systems for harvesting kinetic energy of water streams—one utilizes propeller type turbines with horizontally oriented axis of rotation the other utilizes Darrieus type turbine, which axis of rotation can be oriented vertically or horizontally. One of the main drawbacks of propeller types turbine is that multiplicator and electric power generators have to be located in waterproof capsule, since axis of propeller rotation is always is underwater. This creates the possibility of this capsule flooding and complicates maintenance service of the generator, multiplicator and related auxiliary systems. One of the advantage of Darrieus type turbine is that in case of vertical orientation of its axis of rotation the multiplicator and electric power generator can be located above water level, thus excluding flooding and simplifying maintenance. The other advantages is that, since Darrieus turbine rotates always in one direction regardless of water stream flow direction, it is better suited for harvesting energy of tide, which frequently changes direction of its flow. The systems utilizing propeller type turbine have to have additional mechanism to entire propeller turbine with multiplicator and electric power generator on 180 degree to accommodate changing direction of tide flow. At the present time it is known about two companies that have projects for harvesting energy of ocean tide and current based on utilization Darrieus type turbine, which was patented in 1927 (U.S. Pat. No. 1,835,018) and was widely used for harvesting kinetic energy of the wind.

One of the two mentioned companies—Blue Energy Canada, Inc. is the pioneer of using Darries turbine for harvesting energy of water streams. Their basic design (see their website www.bluenergy.com) utilizes vertically oriented turbine into a frame that is connected to the sea bottom. This limits their use to shallow water straits and rivers. The other company—GCK Technologies Inc. has systems described in the U.S. Pat. No. 6,036,443, issued to Alexander Gorlov. Specific of this patented turbine is in the use of helical blade instead of conventional straight blade of Darrieus turbine. The goal of using helical blade is to provide to turbine self-starting capability. Presently all 2 and 3 blades Darrieus turbines used for harvesting wind energy and converting it to electricity are started by a motor. Since this motor, after turbine reaches synchronous speed of AC power in the grid, starts to operate as generator the absence of self-starting capability is not a problem at all for systems supplying electricity in power grid.

Installations for harvesting kinetic energy of water streams shown in Gorlov U.S. Pat. No. 6,036,443 are located underwater, thus making them vulnerable for flooding and are not accessible for frequent maintenance. Gorlov also came up with submerged floating system that can anchored in deep waters to sea bottom by mooring lines. This floating system is described in article "Helical Turbines for the Gulf Stream: Conceptual Approach to Design of a Large-Scale Floating Power Farm", see Marine Technology, Vol. 35, July 1998, pp. 175–182.

Objects and Advantages

The main objective of IHOC invention is to create a new and more practical system for harvesting kinetic energy of ocean current and tides in deepwaters, by overcoming the drawbacks of the known systems utilizing Darries type turbine.

At the present time there is no one system in operation that can harvest kinetic energy of ocean or tidal currents in deepwaters. The known systems addressing this subject, which conceptual description are published in special magazines, are of submerged type and floating type. Submerged type can withstand stormy weather but makes regular maintenance and small repairs so complicated that it makes entire system unreliable for continuous operation. The floating type, that provides capability to service power generating systems on a regular basis, are subject to waves actions, which can at one time fully destroy them.

The IHOC advantage is in its capability to solve this problem by employing special semisubmersible floating platform, which can be anchored in deep waters and allows to locate turbine on a sufficient depth bellow sea level and have multiplicator and electric power generator located on the upper deck of the semisubmersible platform out of reach by waves. Thus provides it with the advantage of being capable of harvesting energy of powerful ocean currents such as Gulf Stream near Florida, Kurashiwo near Japan and tides in deep water straits such as Strait of San Bernardino in Philippines, Strait of Messino in Italy, etc. Also, sine the gigantic dimensions of the ocean current opens up an opportunity to have the hydraulic turbines also of gigantic dimensions. Since large turbines and generators are more efficient than small ones, this leads to the advantage of having higher efficiency of the entire system for harvesting ocean energy. Larger turbines and generators are more efficient. In case of IHOC the maximum size of hydraulic turbine would be determined by the manufacturing industry capability and by the magnitude of the torque transmitted through its central shaft.

Among other objects of IHOC is the increase in the entire system efficiency through the increase of turbine efficiency. This is achieved by employing two blade turbine wheels, which have the highest efficiency, in an innovative way that excludes their drawback—vibration due to pulsation of the torque on the turbine shaft.

SUMMARY OF THE INVENTION

The IHOC utilizes semisubmersible floating platform for installing hydraulic turbines on a significant depth, out of the zone of significant wave actions, and perpendicular to the current. Semisubmersible platform also allows to locate electric power generator assemblies above water level and above the zone of wave actions.

The present depth limits for semisubmersible platform installation is about 3 km. When IHOC will be installed in a zone of permanently acting current the anchor-mooring arrangements are needed only from one side. This is because the wind forces acting on the above water part of IHOC and wave forces acting on a sparsely located vertical column are much smaller than the constant hydraulic pressure of the ocean current acting on the submerged turbines and their funnels. When IHOC will be installed in the zone of tide, where current is alternate on 180 degree the anchor-mooring arrangements are needed from opposite side of IHOC.

As a means for converting kinetic energy of the water stream, the IHOC utilizes concept of the Darrieus type reaction turbine (U.S. Pat. No. 1,835,018).

There are three preferred Embodiment of IHOC.

Embodiment A is the IHOC design, which takes-off the torque developed by turbine from several points on the turbine wheel outer diameter, that serves as a tooth-pin gear.

Embodiment B is the IHOC design, which takes-off torque developed by turbine from its central shaft.

Embodiment C is the IHOC design that has inlet funnels and anchor mooring systems located from both sides, thus permitting their use for harvesting the kinetic energy of tides that alternating direction of their movement on 180 degrees.

BRIEF DESCRIPTION OF DRAWINGS

FIG. 12—Elevation.
FIG. 13—Side View.
FIG. 14—Plan.
FIG. 15—Enlargement of Elevation from FIG. 12.
FIG. 16—Enlargement of Side View from FIG. 13.
FIG. 17—Section K—K from FIG. 16.
FIG. 18—Section L—L from FIG. 15.
FIG. 21—Turbine wheel.
FIG. 22—Section O—O from FIG. 21.
FIG. 23—Section P—P from FIG. 21.
FIG. 24—Section R—R from FIG. 21.
FIG. 25—Section S—S from FIG. 22.

Embodiment A

The Embodiment A illustrates a design for harvesting energy of ocean current in deep waters. By this design the torque from the turbine wheel is transmitted to several (two) power generator assemblies through several (two) vertical shafts which by their low ends are engaged with tooth-pin wheel attached to upper part of the turbine wheel. When a large size turbine rotates with a low speed of a few RPM it generates a two big torque for conventional gearboxes to accommodate it. The Embodiment A is an illustration of a design that spreads this torque to a manageable level by uptake of the power from rotating turbine from several, at least two, points on its perimeter. For this purpose along the turbine upper ring is located tooth-pin wheel. The two tooth-gears, which are engaged with the tooth-pin wheel, have special provisions that keep the engagement between wheel and gear constant, thus compensating the horizontal and vertical deviation of the point of contact between wheel and gear. These deviations are inevitable because of manufacturing and assembling tolerances, which on the diameter of 20 meters can amount to several centimeters at the point of contact.

Because the turbine height is significant (about 20 meters), what effects the stability and strength of the blades, the height of each blade is reduced to half of the turbine height. For this purpose the turbine has three outer rings—upper, middle and lower. The blades are located between two rings. This allows to shift position of blades on the level between middle and lower rings on 30 degrees, in comparison with blades positions between upper and middle rings. This, besides reducing the blade height, will allow to smooth pulsation of the developed torque by factor of 2, assuming that the total number of blades is 6 and they are equally distributed along the perimeter of the ring. The use of semisubmersible platform as a support for turbines creates an opportunity to install funnels for directing additional volume of water through the turbine, thus increasing its energy output.

All structural elements of semisubmersible platform and the turbines are from pipes, which internal volume is sealed and filled with a substance lighter than water. The blades internal volume is also sealed and filled with the same substance. Thus will provide to the IHOC sufficient positive buoyancy to compensate its weight and current pressure.

DETAILED DESCRIPTION OF THE INVENTION

Figure 1:
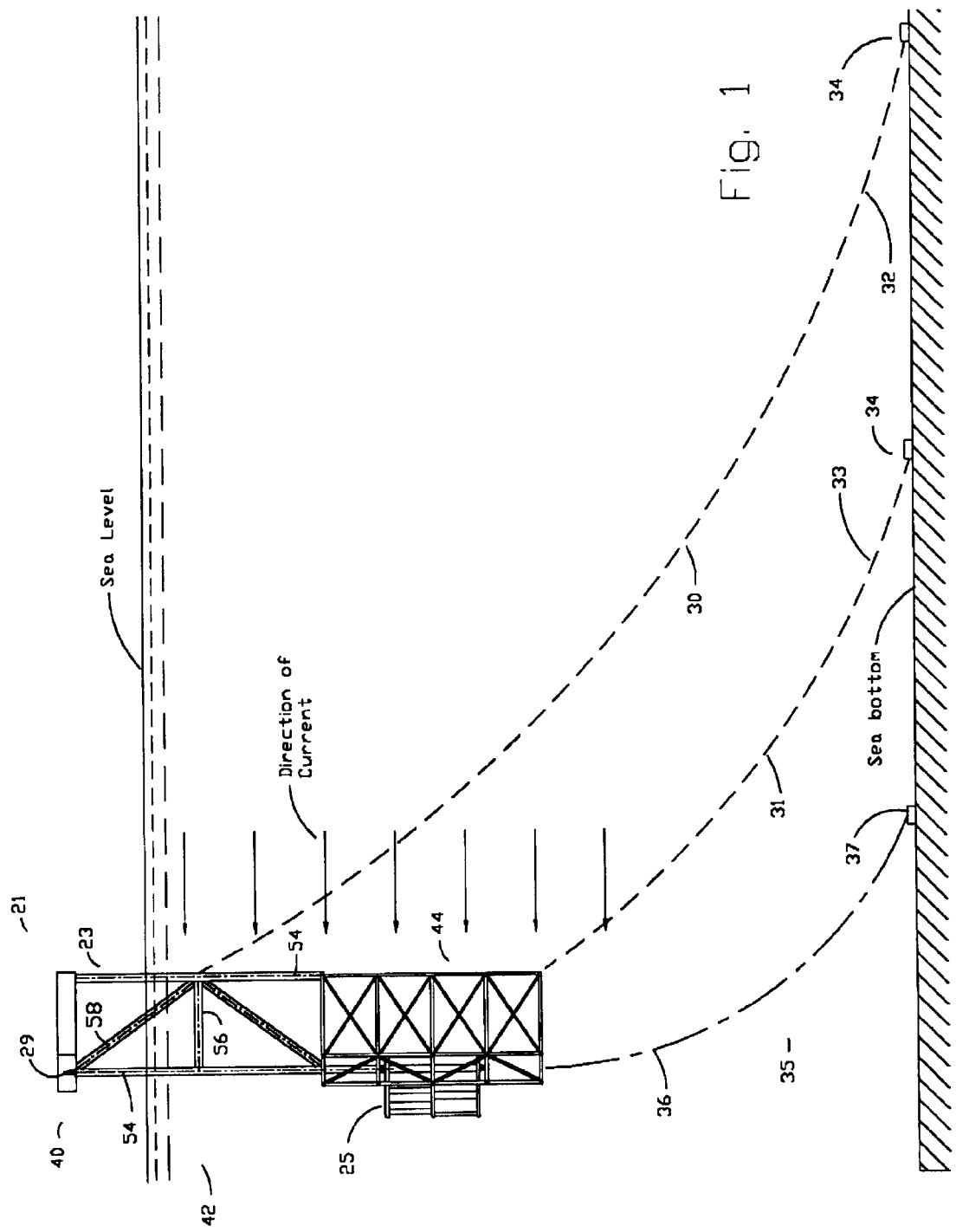
FIG. 1—Elevation.
Figure 2:
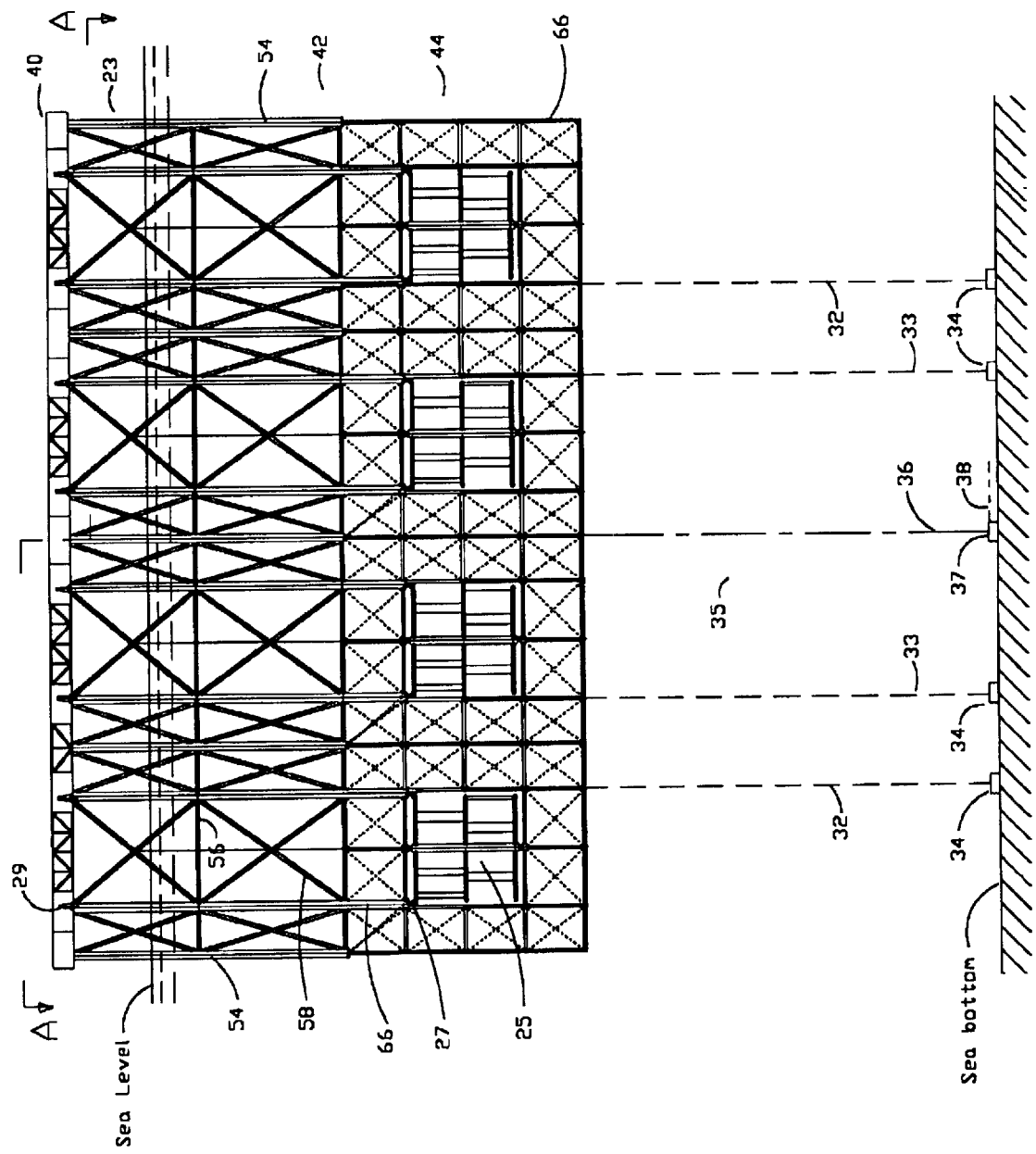
FIG. 2—Side view.
Figure 3:
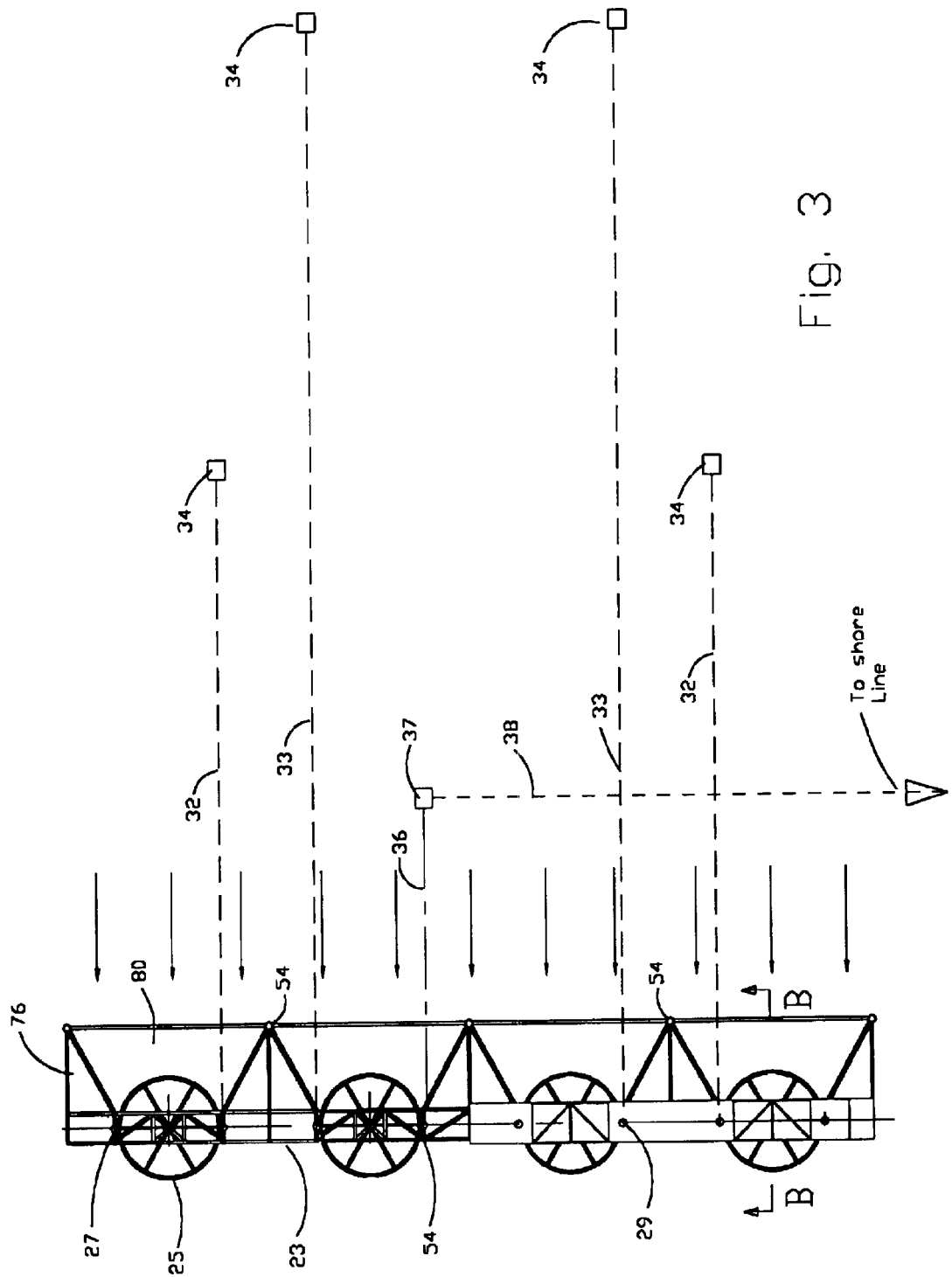
FIG. 3—Plan, section A—A from FIG. 2.

FIGS. 1 through 3 show general arrangement of the IHOC in Elevation, Side View and Plan. The IHOC 21 consist semisubmersible platform 23, turbine 25, turbine drive 27, electric power generator assembly 29, two anchor-mooring arrangements 30, 31, each consisting of pair of mooring lines 32 and 33, which are attached to anchors 34. Generated power is transmitted to shore through a flexible cable 35 to anchor 36 and further through underwater electric cable 37.

The semisubmersible platform 23 consists of upper structure 40, intermediate section 42 and lower frame 44.

The upper structure 40 houses the electric power generator assembly 29 and also has room for temporally accommodation maintenance and repair crew.

The intermediate section 42 consists of vertical columns 54; cross beams 56 and braces 58. All of these elements are from hermetically sealed large diameter pipes, which provide to the submerged platform additional buoyancy. The vertical columns 54, which are located parallel and on some distance apart, are protruding through water level and by this forming water plane area that provides to semisubmersible platform required stability. The vertical columns 54, through which the vertical shafts 111 (see FIG. 10) are going to electric power generating assembly 29, have an internal pipe 130. Pipe 130 is welded to column 54 bottom and top plates 134, thus keeping internal space of column 54 sealed.

Figure 4:
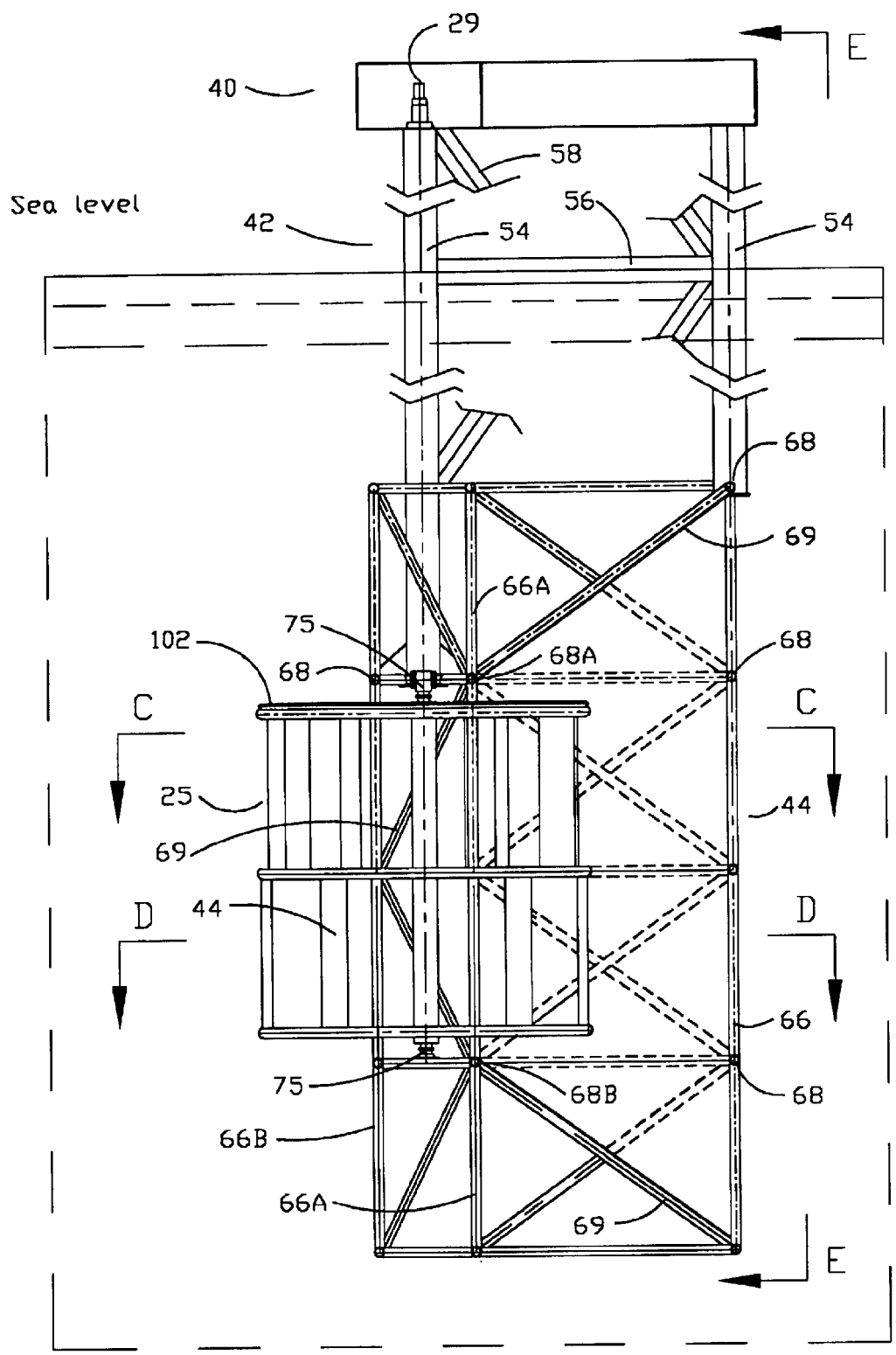
FIG. 4—Section B—B from FIG. 3.
Figure 5:
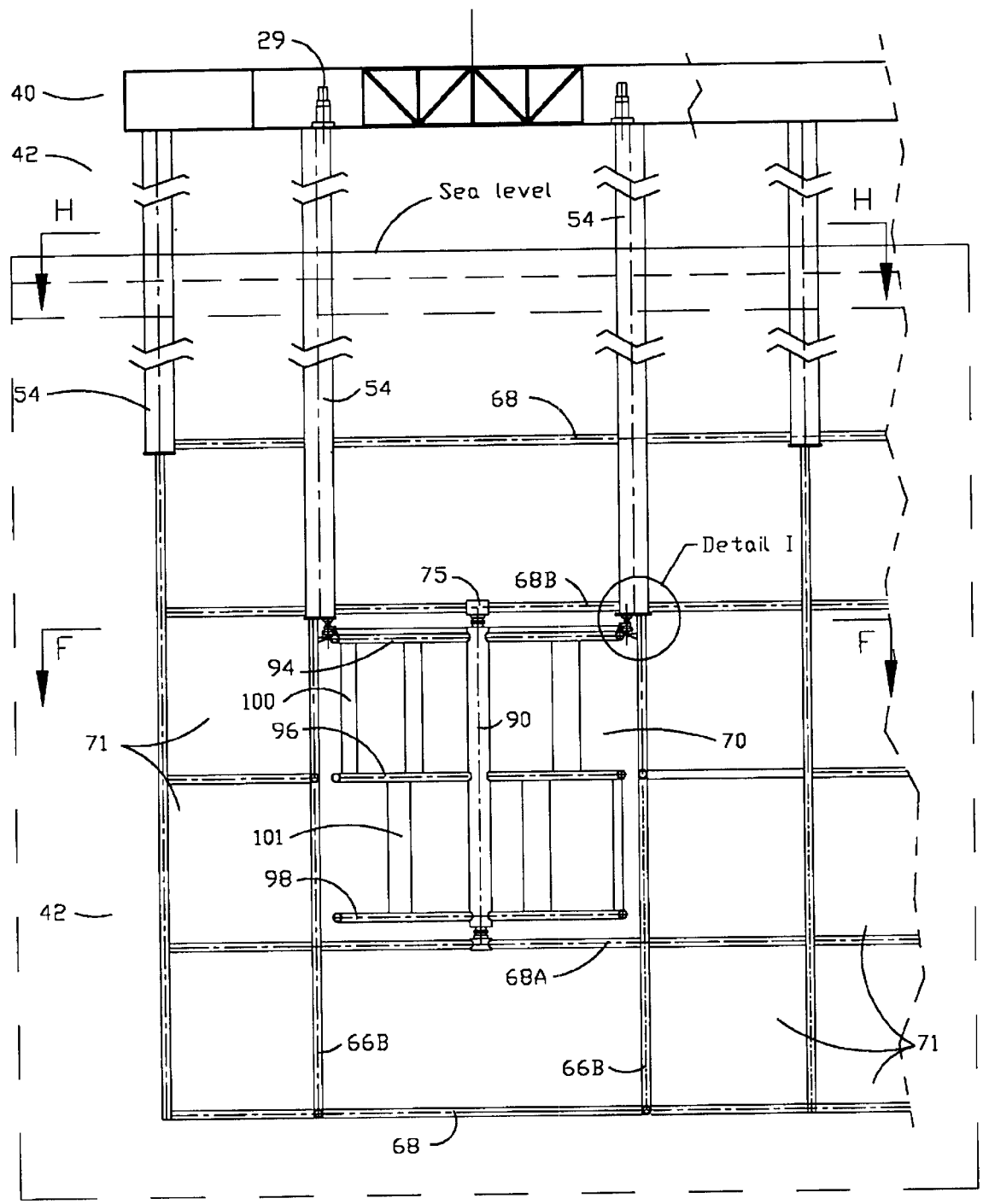
FIG. 5—Section E—E from FIG. 4.
Figure 6:
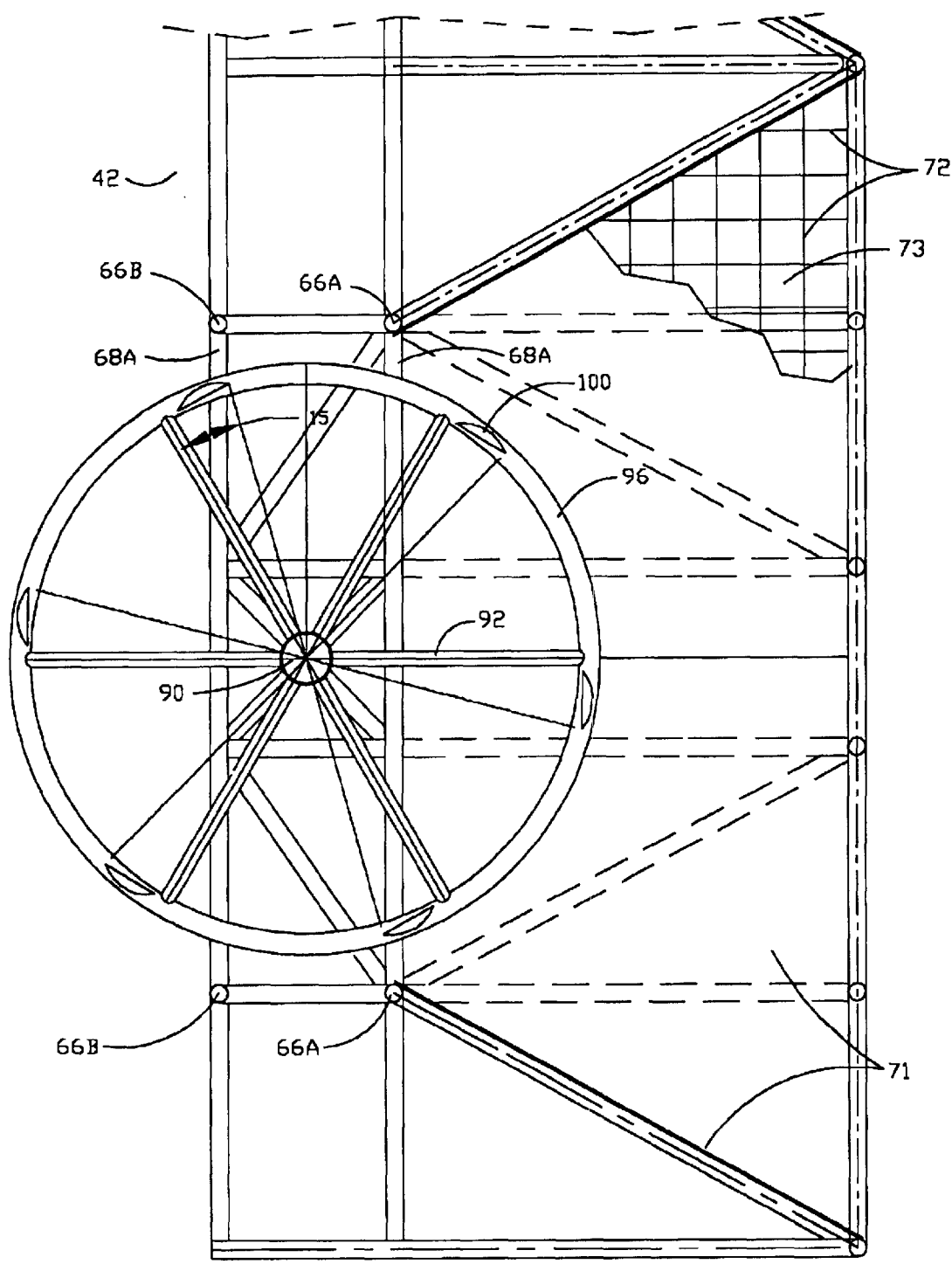
FIG. 6—Section C—C from FIG. 4.

The lower frame 44 (see FIGS. 4, 6 and 6) consists of vertical elements 66, horizontal elements 68 and braces 69. Two rows of vertical elements 66A and 66B in conjunctions with horizontal elements 68A and 68B form a chamber 70, which houses the turbine 25. For this purpose in the middle of chamber 70 are located coupling-bearings 75. The funnel 80 is formed by vertical elements 66, horizontal elements 68 and braces 69. The flat spaces between these elements form panels 71, which are covered by a thick synthetic film 72 and are reinforced by a grid of synthetic ropes 74. These panels are directing additional flow of water into turbine 25.

Figure 7:
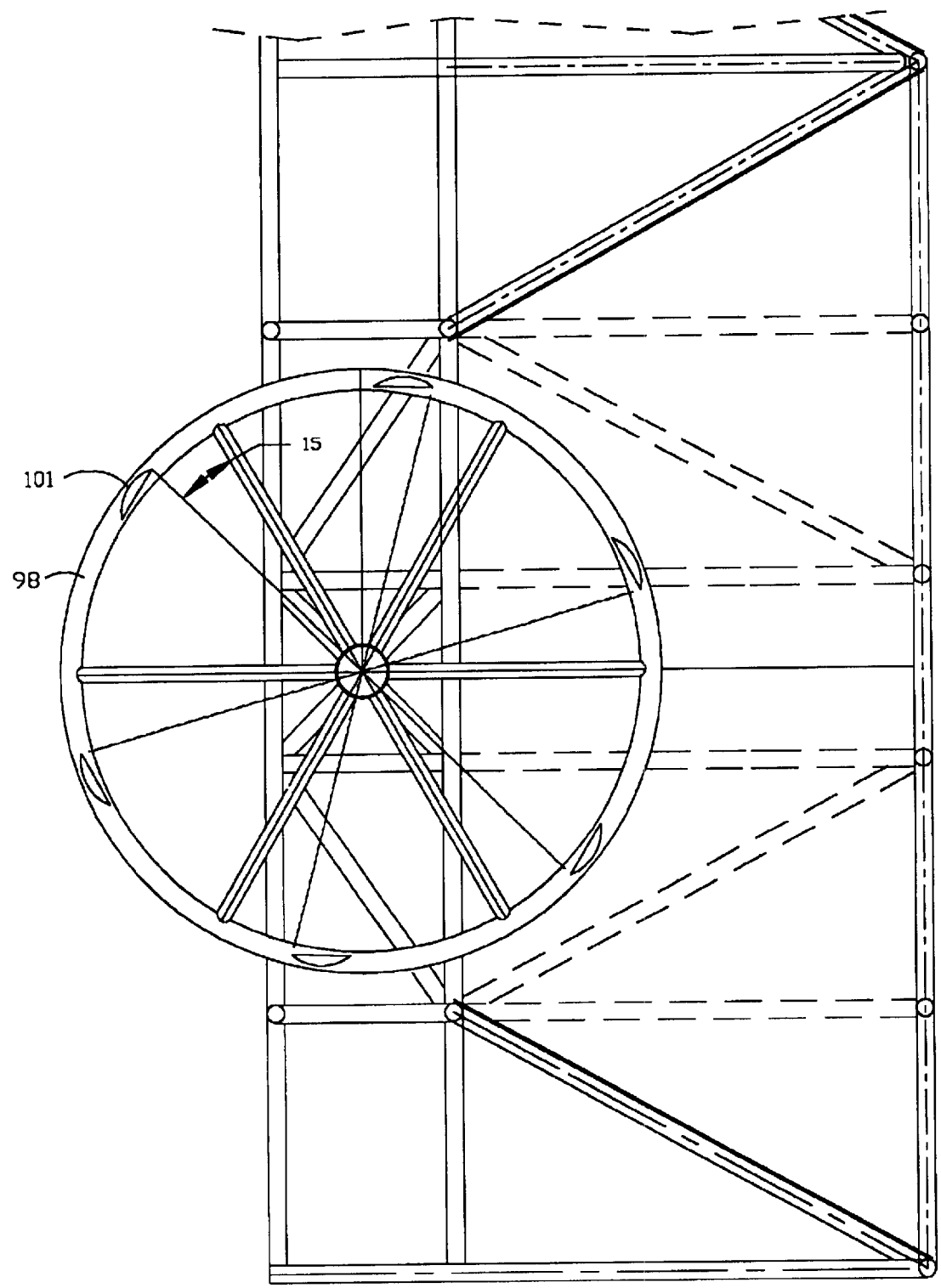
FIG. 7—Section D—D from FIG. 4.
Figure 8:
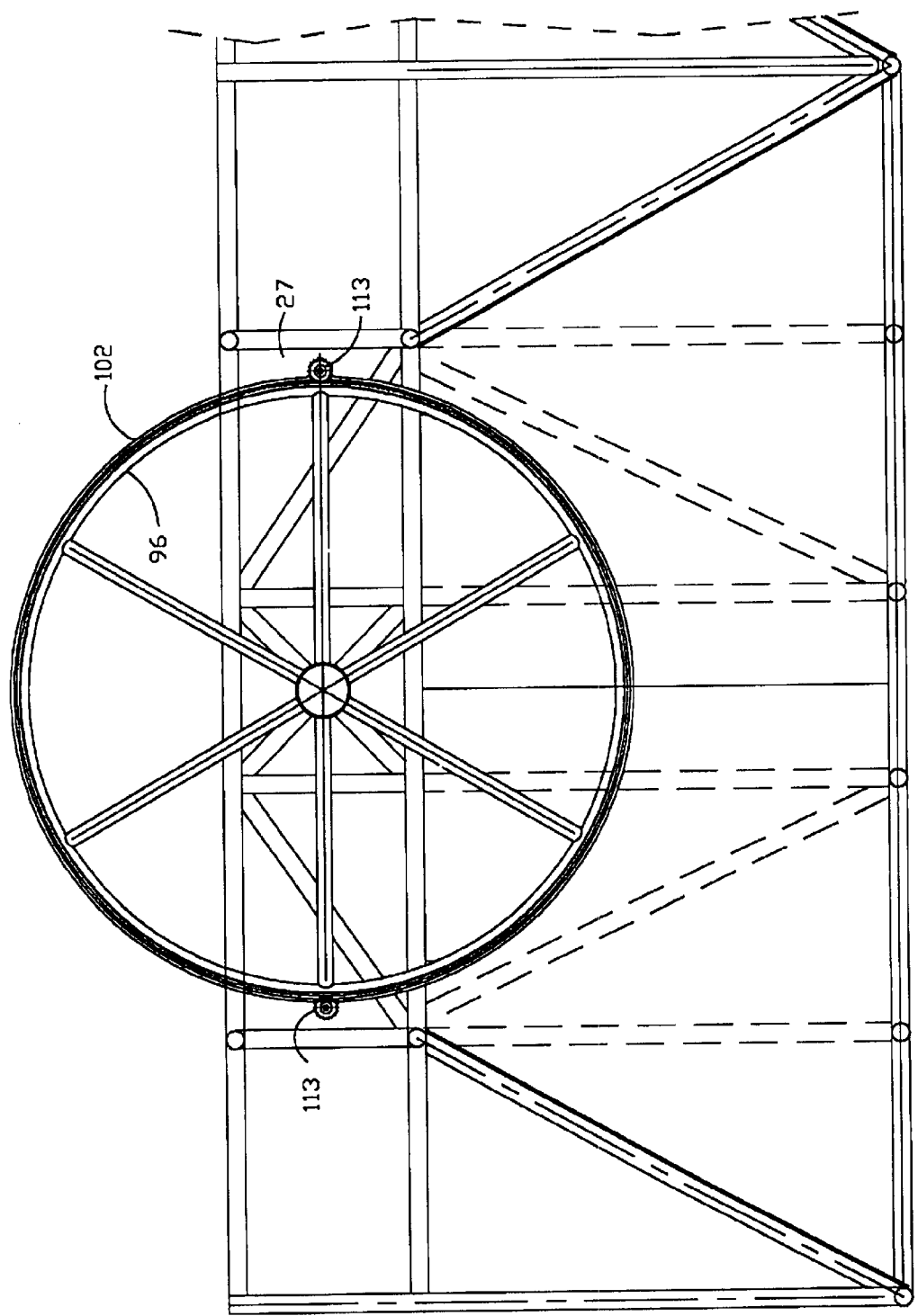
FIG. 8—Drive, Section F—F from FIG. 5.
Figure 9:
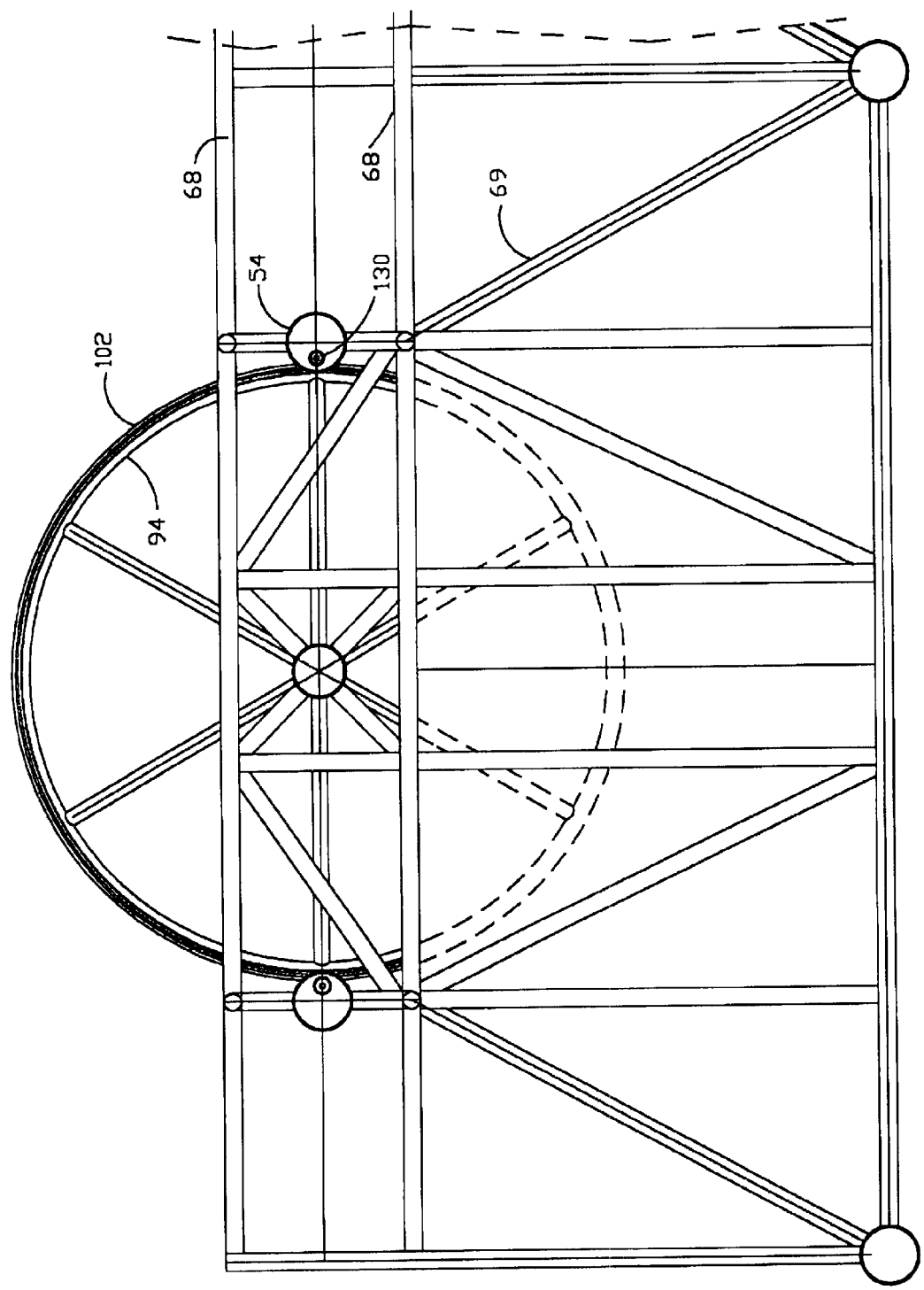
FIG. 9—Drive, Section H—H from FIG. 5.

The turbine 25 consists of a central shaft 90 with two coupling-bearing 75 on its ends; horizontal spokes 92, upper ring 94, middle ring 96 and lower ring 98. The rings 94 and 96 are interconnected by 6 equally spaced blades 100 having hydrofoil profile (see FIG. 6). The rings 96 and 98 are interconnected by 6 equally spaced blades 101, but they are shifted on 30 degrees (see FIG. 7) to reduce pulsation of developed torque.

Figure 10:
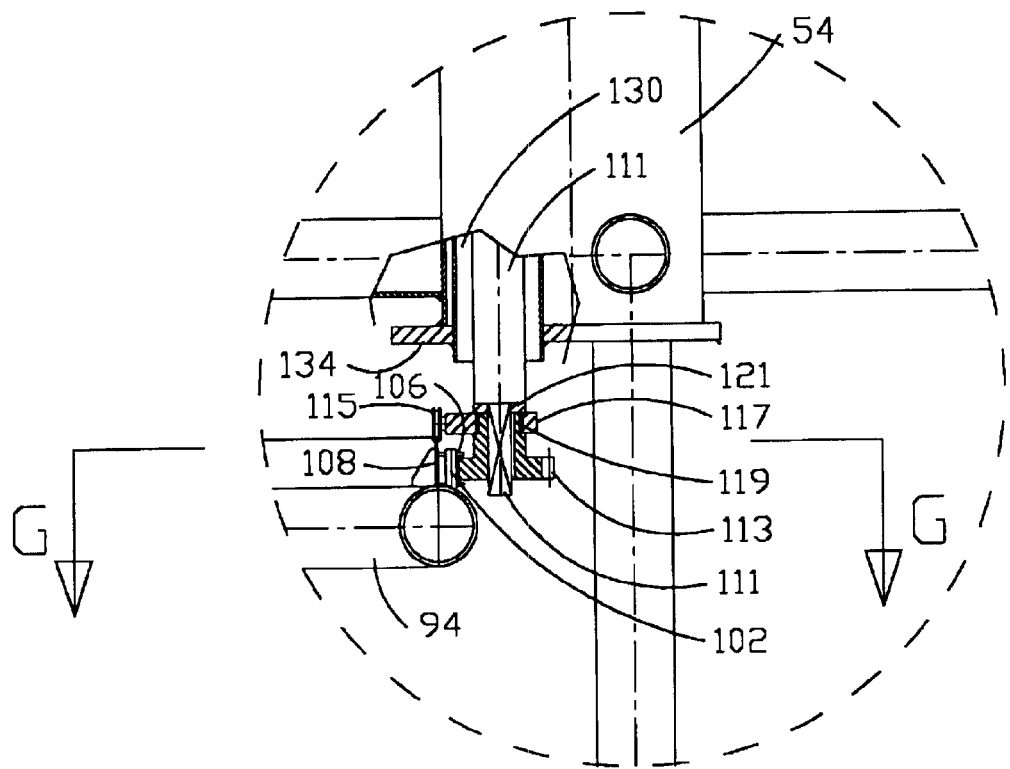
FIG. 10—Drive, Detail I from FIG. 5.
Figure 11:
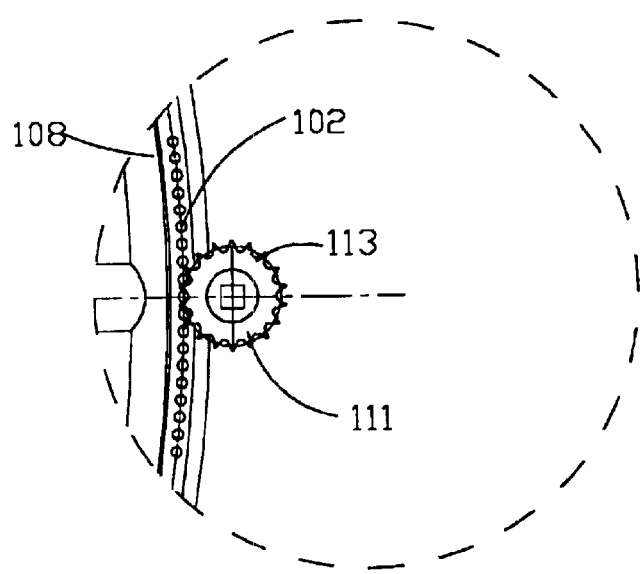
FIG. 11—Drive, Section G—G from FIG. 10.
Figure 19:
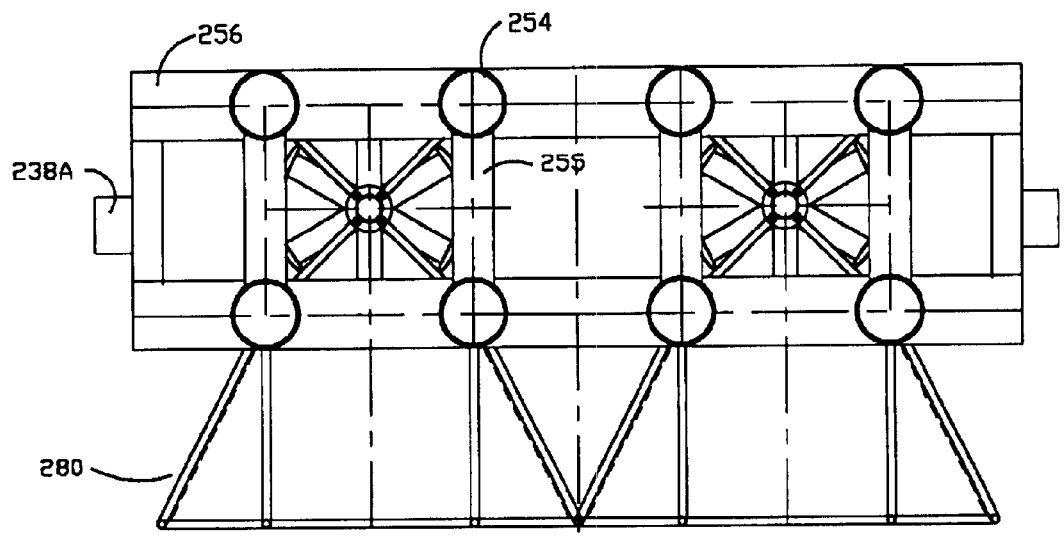
FIG. 19—Section M—M from FIG. 16.
Figure 20:
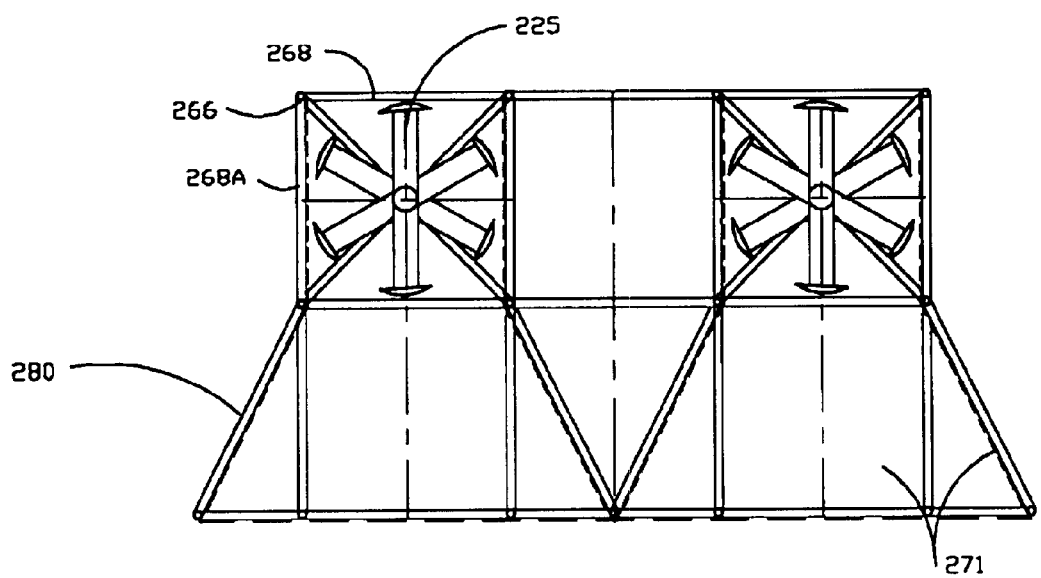
FIG. 20—Section N—N from FIG. 16.
Figure 27:
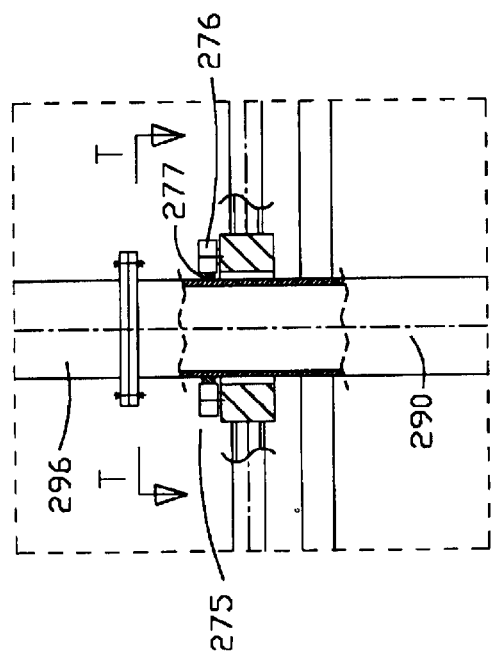
FIG. 27—Detailed II from FIG. 25.
Figure 28:
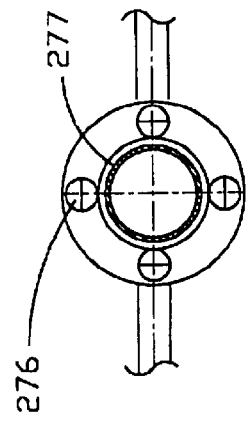
FIG. 28—Section T—T from FIG. 27.
Figure 26:
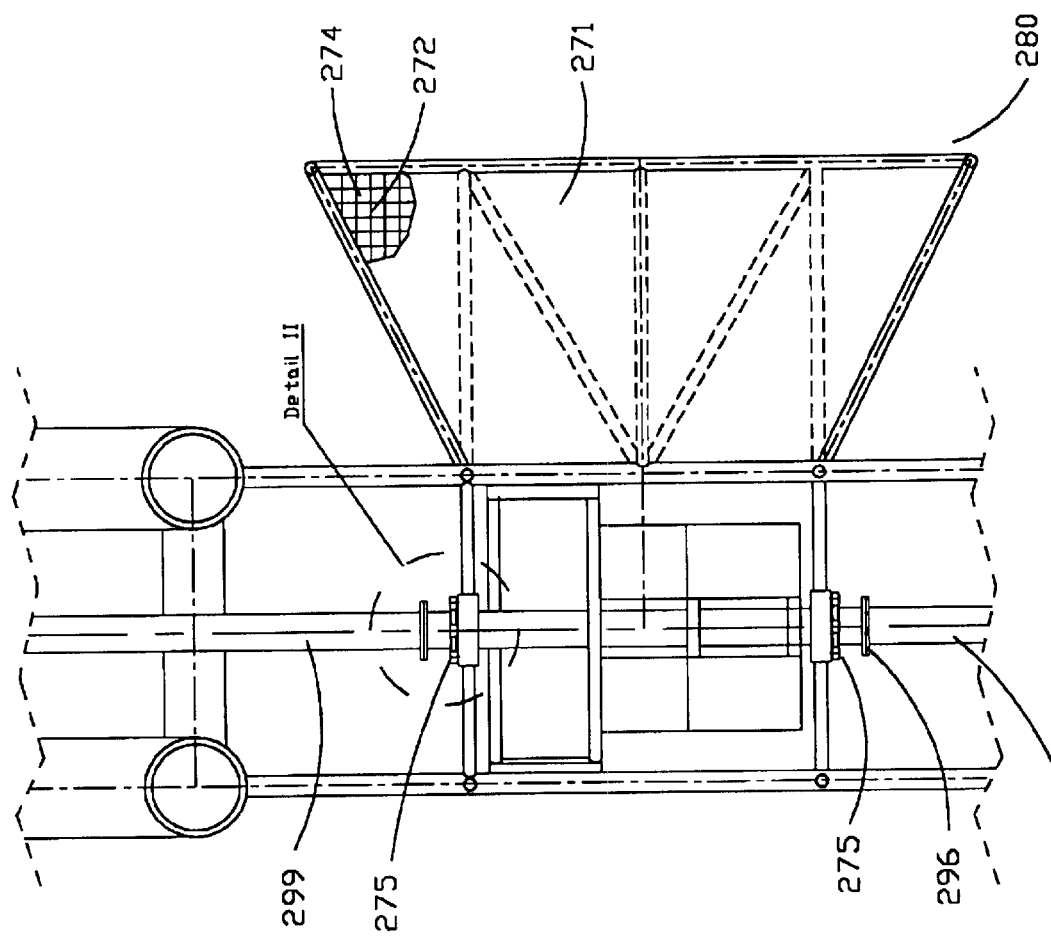
FIG. 26—Detailed I from FIG. 17.

The ring 94 of includes a pin-wheel 102 consisting of a number of equally spaced pins 104, hosed by 2 rings 106, which are welded to a cylinder 108 (see FIGS. 10 and 11). The turbine drive 27 (see FIGS. 10 and 11) consists of a vertical shaft 111, having its end in a form of square shaped bar and tooth-gear 113, having its central opening matching the shape of the vertical shaft 111 end. It also includes a guiding roller 115 and its support 117, connected with tooth-gear 113 through a cylindrical bearing 119 and fixed in this position by a stopper 121.

During turbine rotation guiding roller 115 follows the cam-cylinder 108 deviation in vertical and horizontal direction, thus keeps pin-wheel 102 engagement with tooth-gear 113 constant. This is required to accommodate manufacturing tolerances and misalignments during assembling. Adjustment in vertical in direction is done under the weight of the vertical shaft 111, which keeps guiding roller 115 always in contact with cylinder 108. Adjustment in horizontal direction is possible due to springiness of the long vertical shaft 111.

The anchor-mooring arrangements 30 and 31 are of catenary type. Arrangements 30 are attached symmetrically to upper part of the semisubmersible platform 23 and arrangements 31 are attached symmetrically to the lower part of the platform 23. By this they are taking horizontal force of the current and providing to platform vertical stability. The underwater electric cable system 35 consists of a flexible cable 36, concrete anchor 37 and sea bottom cable 38.

Embodiment B

The Embodiment B illustrates a design that differs from Embodiment A by the way how torque is transmitted to power generator assembly. Also one of the specifics of this design is in the structure of turbine wheel, which consists of three sections each having only two opposite locating blades. All these three sections are shifted in plane on 120 degrees in relation to each other. One of the others specifics is in the structure of the anchor mooring system that has means for controlling semisubmersible platform in vertical position in case the length of anchor mooring lines do not elongate equally.

DETAILED DESCRIPTION OF THE INVENTION

FIGS. 12 through 14 show general arrangement of the IHOC in Elevation, Side View and Plan. The IHOC 221 consist semisubmersible platform 223, turbine 225, electric power generator assembly 229, two anchor-mooring arrangements 230, 231. The anchor-mooring arrangement 230 consists of two 90 degrees wire ropes guides 232, attached to the lower part of the semisubmersible platform, one wire rope 233, which is rived through wire ropes guides 232 and connected by its both ends to two anchors 234. The anchor-mooring arrangement 231 consists of a pair of mooring lines 235 each consisting of anchor chain 236 and wire rope 237 connected to each other. The mooring lines 235 are attached by wire ropes end to anchors 234 and by anchor chain ends to chain tensioners 238 through guide 238A. In case of a slack developed in any of mooring lines the tensioneer 238 will adjust their length and will keep floating semisubmersible platform 223 always in vertical position.

Generated power is transmitted to shore through a flexible cable 239 to anchor 240 and further through underwater electric cable 241.

The semisubmersible platform 23 consists of upper structure 242, intermidiate section 243 and lower frame 244.

The upper structure 242 houses the electric power generator assembly 229 and also has room for temporally accommodation maintenance and repair crew.

The intermediate section 243 consists of vertical column 254 and longitudinal beams 256 and cross beams 255 and 257. All of these elements are from hermetically sealed large diameter pipes, which provide to the submerged platform additional buoyancy. The vertical columns 254, which are located parallel and on some distance apart, are protruding through water level and by this forming water plane area that provides to semisubmersible platform required stability.

The lower frame 244 consists of vertical elements 266, horizontal elements 268 and braces 269. Two rows of vertical elements 266 in conjunctions with two horizontal elements 268 form a chamber 270, which houses the turbine 225.

The funnel 280 is formed by vertical elements 266, horizontal elements 268 and braces 269. The flat spaces between these elements form panels 271, which are covered by a thick synthetic film 272, which are reinforced by a grid of synthetic ropes 274. These panels are directing additional flow of water into turbine 225.

The turbine 225 consists of a turbine wheel 290 having central shaft 291 and three equal horizontal section 292, 293 and 294 each shifted in plane on 120 degrees in relation to each other and each having a pair of blades 295, each connected to shaft 291 through a pare of spokes 296 and 180 degrees apart. The adjacent turbines are connected to each through an intermediate shafts 297 and by couplings 298. The central shaft of upper turbine 225 is connected to power generating assembly 229 by shaft 299. The vertical position of turbine wheel 290 is guided by upper and lower set of bearings 275. Each set of bearing 275, consist of number of rollers 276 equally distributed by circumference of guiding disc 277.

Embodiment C

Embodiment C differs from Embodiments A and B by having inlet funnels and anchor-mooring systems from both sides thus allowing their use for harvesting energy of tides, which are alternating direction of their movement on 180 degree and which are occur in deepwater straits.

Figure 29:
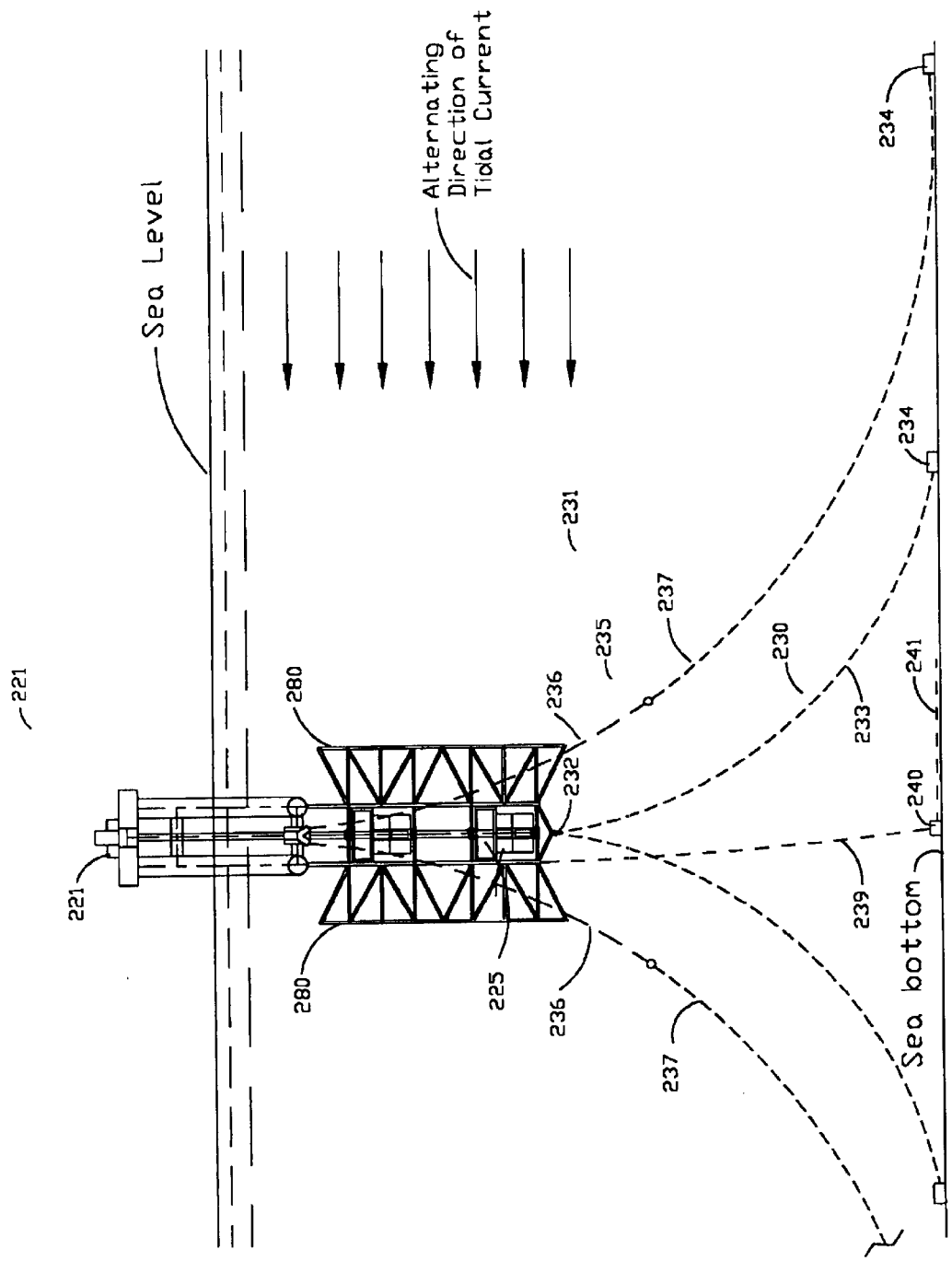
FIG. 29—Illustrates Embodiment C design.

Drawing FIG. 29 illustrates Embodiment C design.

Conclusion and Scope of Invention

The innovation of the instant invention is in a new combination of elements already known and used in variety of applications. This new combination creates a positive effect—capability of harvesting kinetic energy of ocean current and tides acting in deepwaters. As of now there are no known or existing systems that have this capability. The main elements of which IHOC is consisting are: a floating semisubmersible platform, a Darrieus type hydro turbine, an anchor-mooring system and funnel incorporated with turbine and semisubmersible platform.

The floating semisubmersible platform adapted for instant invention has a special underwater frame for housing Darrieus turbine and funnel, which makes it unique in comparison with others known application of semisubmersible platform.

The anchor-mooring system for the floating semisubmersible platform also has an unique features, such the capability of adjusting vertical orientation of semisubmersible platform in cases when elongation of anchor-mooring lines are not equal.

The use of Darrieus type turbine for harvesting kinetic energy of water streams is known. The innovative feature of it in application for instant invention is in the design of the turbine wheel, which consists of three sections each containing a pare of blades located opposite to each other. These pares of blades are shifted in relation toward each other on 120 degrees, thus forming a turbine wheel having high efficiency of two blades turbine and self starting capability of six blade turbine.

While the invention has been particularly shown and described with reference to preferred embodiments therefor, it will be understood by those skilled in the art that the foregoing and other changes in form and details maybe made therein without departing from the scope of the invention.

What is claimed is:

1. Floating installation for converting kinetic energy of ocean currents in deep waters into electricity utilizing Darrieus type turbine, comprising:
    a semisubmersible floating platform having:
        above water level housing,
        underwater frame,
        an intermediate frame having at least four vertical hollow columns connecting said above water housing with said underwater frame and forming waterplane when crossing water level;
        an electric power generator located on said above water level housing,
        a vertically oriented Darrieus type turbine,
        at least a pair of said vertical oriented Darries type turbines rotating in opposite direction and incorporated with said underwater frame;
        a funnel, which is incorporated with said lower frame, has its smaller output opening attached to one side of said turbine and its larger inlet opening facing incoming water stream;
        means for transmitting torque developed by turbine to electric power generator located on said above water level housing
    an anchor-mooring system having at least one set of pair of anchors and mooring lines attached symmetrically to lowest part of said underwater frame and at least one set of pair of anchors and mooring lines attached symmetrically to upper parts of said underwater frame;
    means for transmitting onshore generated electrical power consisting of a flexible power cable, which by one end is attached to lower end of said underwater frame and by other end to an anchor on sea bottom through which it is connected to underwater cable on the sea floor.

2. Floating installation by claim 1, wherein said vertically oriented Darrieus type turbine consists of:
    a central shaft with two coupling-bearing on its ends;
    a horizontal spokes,
    set of blades, having hydrofoil profile;
    upper, middle and lower rings, which are interconnected by equally spaced said set of blades, position of which between said upper and middle rings and middle and lower rings is shifted at least on half of angle between said blades.

3. Floating installation by claim 1, wherein said means for transmitting torque developed by turbine to electric power generator located on said above water level housing consists of:
    a pin-wheel attached to said upper ring of said Darrieus type turbine,
    at least two turbine drives engaged with said pin-wheel and equally distributed along said pin tooth-wheel,
    each said turbine drive consists of:
        a vertical shaft with tooth-gear on its end and which by its lower end is engaged with said pin-wheel and by its upper end is engaged with said electric power generator located on said above water housing;
        a guiding roller, which is connected with said tooth-gear and engaged with cam-cylinder located on said upper ring, thus keeps said tooth-gear in constant contact with said pin tooth-wheel.

4. Floating installation for converting kinetic energy of ocean currents into electricity utilizing Darrieus type turbine, comprising:
    a semisubmersible floating platform having:
        above water level housing,
        underwater frame,
        an intermediate frame having at least four vertical hollow columns connecting said above water housing with said underwater frame and forming waterplane when crossing water level;
        an electric power generator located on said above water level housing,
        a vertically oriented Darrieus type turbine,
        at least a pair of columns of said vertical oriented Darries type turbines, interconnected to each other, rotating in opposite direction and incorporated with said underwater frame;
        a funnel, which is incorporated with said lower frame, has its smaller output opening attached to one side of said turbine and its larger inlet opening facing incoming water stream;
        means for transmitting torque developed by turbine to electric power generator located on said above water level housing consisting of:
            shaft connecting said turbines located on one vertical column line,
            said central shafts of said turbines,
            output shaft connecting upper turbine said central shaft with electric power generator located on the said above water level housing,
        an anchor-mooring system having at least one set of pair of anchors and one mooring line engaged with the lowest part of said underwater frame and at least one set of pair of anchors and mooring lines attached to upper parts of said underwater frame;
        means for transmitting onshore generated electrical power consisting of a flexible power cable, which by one end is attached to lower end of said underwater frame and by other end to an anchor on sea bottom through which it is connected to underwater cable on the sea floor.

5. Floating installation by claim 4, wherein the turbine wheel of said vertically oriented Darrieus turbine consists of:
- a central shaft,
- three equal horizontal sections each shifted in plane on 120 degrees in relation to each other and each having:
  - a pair of blades located 180 degrees apart,
  - a pair of spokes connecting said blades with said central shaft.

6. Floating installation by claim 4, wherein said pair of anchors and one mooring line attached to lowest part of said underwater frame are consisting of:
- two anchors located on the sea bottom,
- two 90 degree rope guides attached close to the outer ends of the lowest part of said underwater platform,
- one mooring line attached by one end to said one anchor and by other end to said other anchor and passing through said two 90 degree rope guides.

7. Floating installation by claim 4, wherein said pair of mooring lines attached to upper part of said underwater frame are consisting of:
- two anchors located on the sea floor,
- pair of chain guides attached to upper part and on the left and right sides of said underwater frame,
- two chain tensioneer located on the upper part of said above water housing and
- two mooring lines consisting of chain and wire rope and attached by wire rope to said anchor and by chain to said chain tensioneer.

8. Floating installation by claim 4, wherein the said funnel attached to said turbine channel consists of a frame formed by pipes and panels formed by synthetic films reinforced by grid of synthetic ropes.

9. Floating installation for converting kinetic energy of ocean tides in deep waters into electricity utilizing Darrieus type turbine, comprising:

a semisubmersible floating platform having:
- above water level housing,
- underwater frame,
- an intermediate frame having at least four vertical hollow columns connecting said above water housing with said underwater frame and forming waterplane when crossing water level;
- an electric power generator located on said above water level housing,
- a vertically oriented Darrieus type turbine,
- at least a pair of said vertical oriental Darries type turbines rotating in opposite direction and incorporated with said underwater frame;
- two funnels, which are incorporated with said lower frame and are attached to opposite sides of said turbine by their smaller output opening and have their larger inlet openings located 180 degree apart, thus guiding tidal water stream through turbine regardless of change in the tide direction;
- means for transmitting torque developed by turbine to electric power generator located on said above water level housing, an anchor-mooring system having at least one set of pair of anchors and mooring lines attached symmetrically to lowest part of said underwater frame and at least one set of pair of anchors and mooring lines attached symmetrically to upper parts of said underwater frame;

means for transmitting onshore generated electrical power consisting of a flexible power cable, which by one end is attached to lower end of said underwater frame and by other end to an anchor on sea bottom through which it is connected to underwater cable on the sea floor.

* * * * *